(12) United States Patent
Zaugg et al.

(10) Patent No.: US 8,292,748 B2
(45) Date of Patent: Oct. 23, 2012

(54) DAMPER WITH INDUCED IMBALANCE

(75) Inventors: Brian Zaugg, Millersburg, OH (US);
Patrick Lindemann, Wooster, OH (US);
Thushan Sivapatham, Medina, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 255 days.

(21) Appl. No.: 12/724,936

(22) Filed: Mar. 16, 2010

(65) Prior Publication Data

US 2010/0234114 A1    Sep. 16, 2010

Related U.S. Application Data

(60) Provisional application No. 61/210,203, filed on Mar. 16, 2009.

(51) Int. Cl.
*F16F 15/121* (2006.01)
(52) U.S. Cl. ...................... 464/68.8; 464/68.1
(58) Field of Classification Search .............. 464/66.1, 464/68.1, 68.8, 98, 99; 192/207
See application file for complete search history.

(56) References Cited

U.S. PATENT DOCUMENTS

| | | | |
|---|---|---|---|
| 2,467,980 A * | 4/1949 | Lambert | 464/66.1 X |
| 4,591,041 A | 5/1986 | Valier | |
| 4,783,895 A | 11/1988 | Reik | |
| 5,447,218 A | 9/1995 | Tauvron | |
| 5,762,558 A | 6/1998 | Takehira | |
| 6,676,526 B1 * | 1/2004 | Poster | 464/99 |
| 2009/0044659 A1 * | 2/2009 | Brambila et al. | 464/98 X |

* cited by examiner

*Primary Examiner* — Gregory Binda
(74) *Attorney, Agent, or Firm* — Simpson & Simpson, PLLC

(57) ABSTRACT

A torsion damper including: a plurality of springs; a first plate with a central axis; and a second plate with a central axis. The plurality of springs displaces the first and second plates so that the central axis for the first plate is radially offset from the central axis for the second plate. In one embodiment, the radial offset between the central axis for the first plate and the central axis for the second plate is fixed. In another embodiment, the first plate comprises a central bore and the second plate comprises an extruded cylinder; and the fixed alignment is maintained by contact between the central bore and the extruded cylinder.

16 Claims, 5 Drawing Sheets

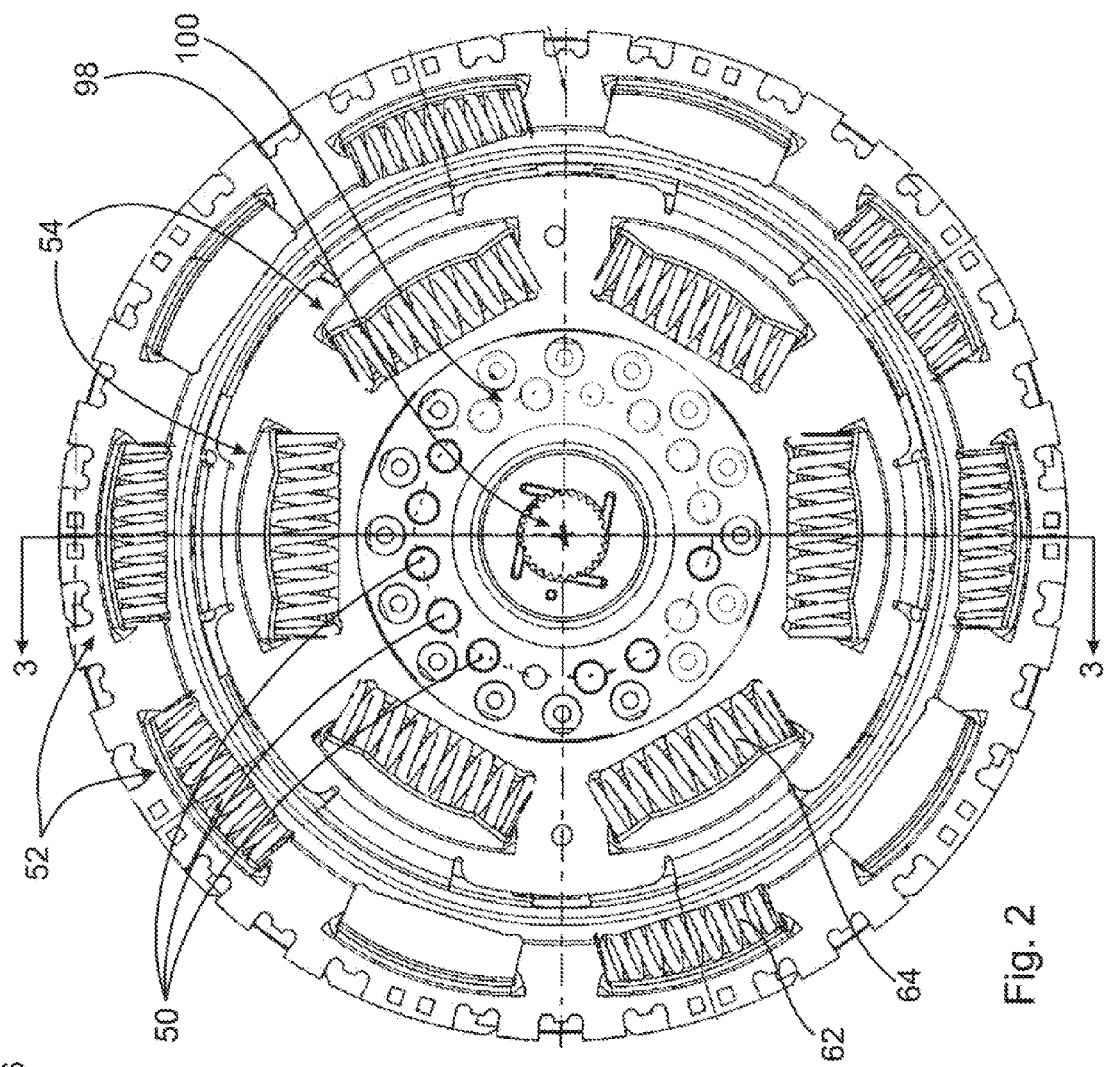
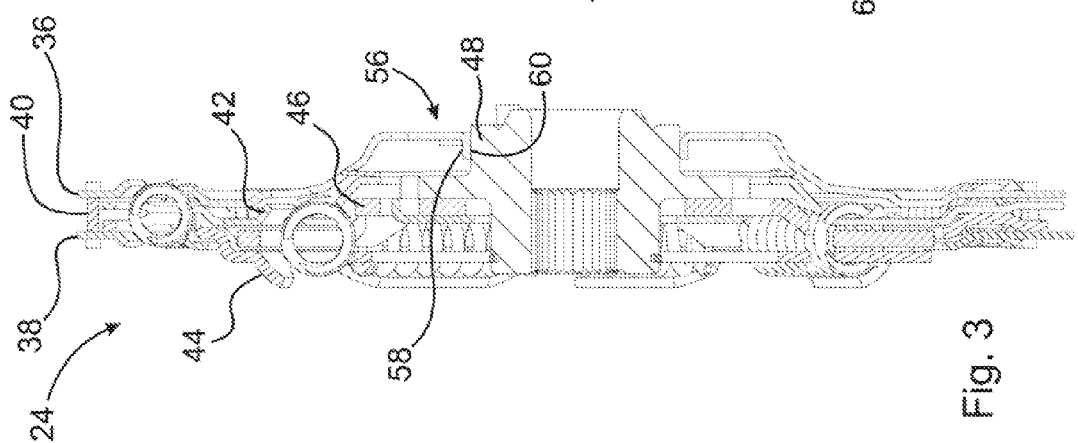

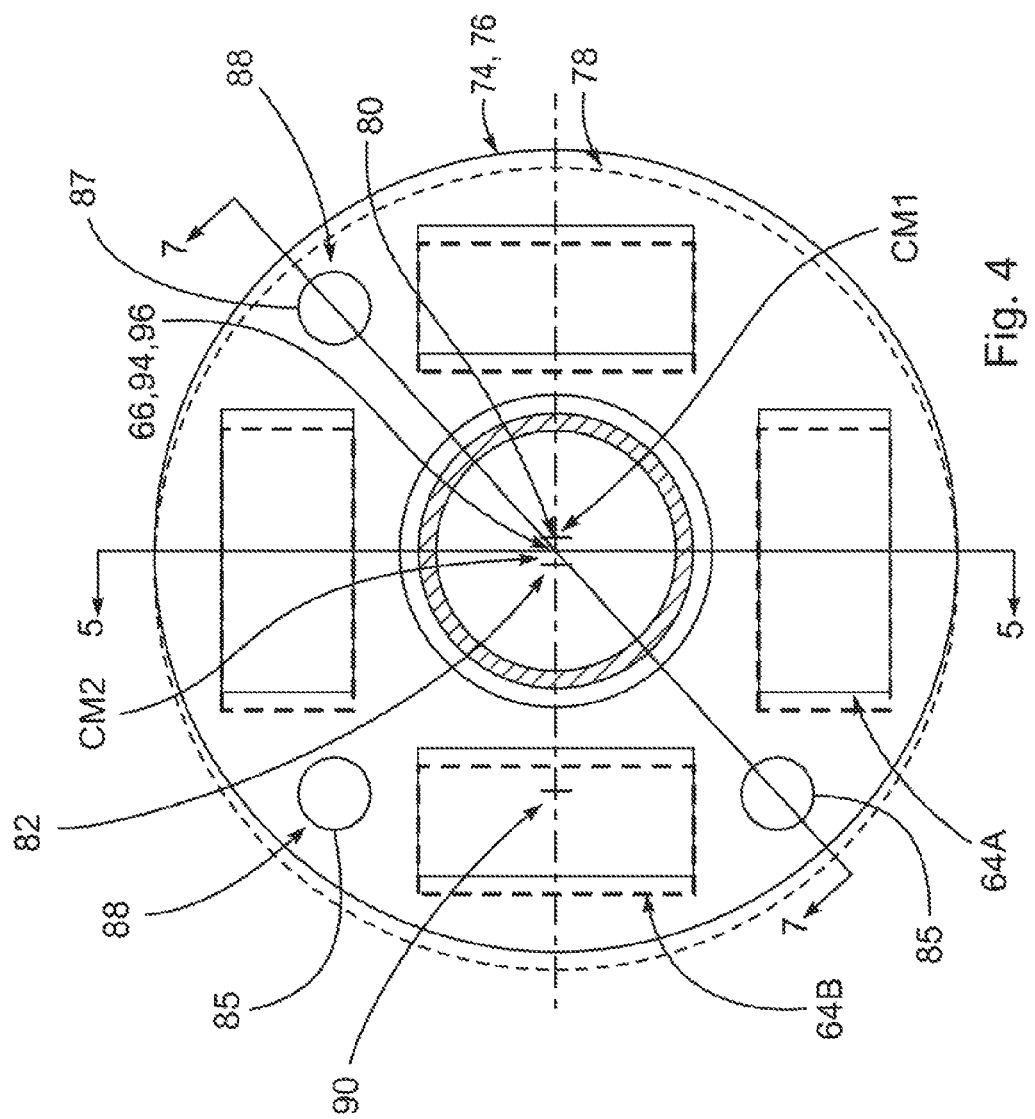
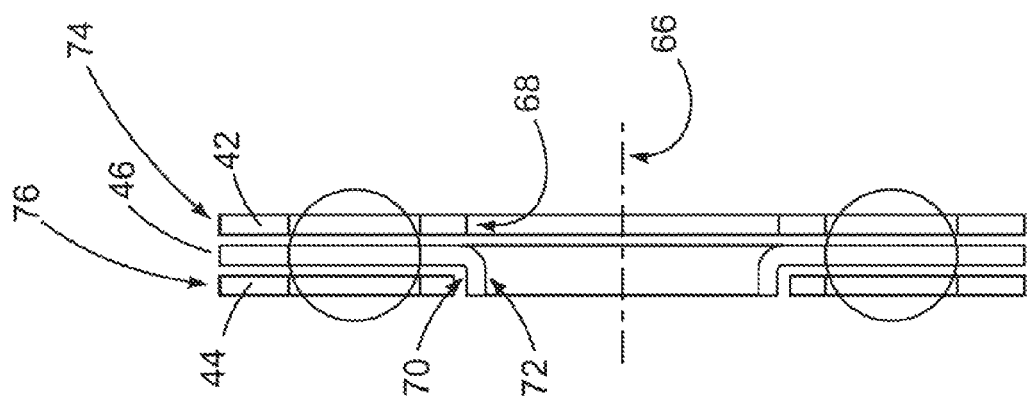

DAMPER WITH INDUCED IMBALANCE

CROSS-REFERENCE TO RELATED APPLICATIONS

This application claims the benefit under 35 U.S.C. §119 (e) of U.S. Provisional Application No. 61/210,203, filed Mar. 16, 2009, which application is incorporated herein by reference.

FIELD OF THE INVENTION

The invention relates generally to a torsion damper, and more specifically to a torsion damper with induced imbalance.

BACKGROUND OF THE INVENTION

The prior art teaches torsion dampers with springs for providing torsional flexibility, cover plates for containing the springs and receiving torque from an input element (i.e., an engine crankshaft), and flanges for transmitting torque from the springs to an output element (i.e., a transmission input shaft). Flanges for conventional dampers are usually engaged, often by a spline connection, with a hub disposed on the input shaft. The spline connection adequately centers the flange relative to a central axis of the damper.

Prior art series dampers offer improved torsional isolation by increasing rotational travel of the damper. Series dampers often have two flanges, one of which is a floating flange. Prior art floating flanges are usually positioned by the springs. That is, the flanges have cutouts for receiving the springs which are, in turn, positioned in formed cover plate windows. The geometrical position of the springs maintains the flange in a generally centered position with regards to a central axis of the damper without additional centering features.

BRIEF SUMMARY OF THE INVENTION

The present invention broadly comprises a torsion damper including: a plurality of springs; a first plate with a central axis; and a second plate with a central axis. The plurality of springs displaces the first and second plates so that the central axis for the first plate is radially offset from the central axis for the second plate. In one embodiment, the radial offset between the central axis for the first plate and the central axis for the second plate is fixed. In another embodiment, the first plate comprises a central bore and the second plate comprises an extruded cylinder; and the fixed alignment is maintained by contact between the central bore and the extruded cylinder.

In one embodiment, the first plate comprises a central bore and the second plate comprises an extruded cylinder and the plurality of springs displaces the first and second plates so that the central bore and the extruded cylinder are in contact. In another embodiment, the first or second plate exhibits rotational imbalance when rotated about its central axis. In one embodiment, the first or second plate includes a respective cutout and under rotation, the respective cutout unbalances the first or second plate. In another embodiment, the first or second plate includes a respective mass element attached to the plate and wherein, under rotation, the respective mass element unbalances the first or second plate. In one embodiment, the first plate includes an outer circumference and a central bore forming an inner circumference and a radial distance between the inner and outer circumferences is non-uniform.

The present invention also broadly comprises a torsion damper including: a first plate with an outer diameter; a first plurality of apertures disposed in the first plate; and a central bore in the first plate. Prior to forming the central bore and the first plurality of apertures in the first plate, the first plate has a first center of mass and the first plate with the central bore has a second center of mass radially displaced from the first center of mass. In one embodiment, the first plate with the central bore and the first plurality of apertures has the second center of mass.

In one embodiment, the torsion damper includes: a second plate with a second plurality of apertures; and a plurality of springs disposed in the first and second pluralities of apertures. In another embodiment, the first plate includes a first central axis passing through the second center of mass, the second plate includes a center of mass and a second central axis parallel to the first central axis and passing through the center of mass for the second plate, and the first central axis and the second central axis are radially offset. In one embodiment, the first central axis and the second central axis are in a fixed radial alignment. In another embodiment, the second plate comprises an extruded cylinder and the fixed alignment is maintained by contact between the first plate central bore and the second plate extruded cylinder.

In one embodiment, the torsion damper includes: a second plate with an extruded cylinder and a second plurality of apertures; and plurality of springs disposed in the first and second apertures. The plurality of springs displaces the first and second plates so that the central bore and the extruded cylinder are in contact. In another embodiment, the first plate includes an outer circumference and the central bore forms an inner circumference and a radial distance between the inner and outer circumferences is non-uniform.

BRIEF DESCRIPTION OF THE DRAWINGS

The nature and mode of operation of the present invention will now be more fully described in the following detailed description of the invention taken with the accompanying drawing figures, in which:

FIG. 2 is a front view of a torsional damper according to an example aspect of the invention;

FIG. 3 is a cross-sectional view of the torsional damper shown in FIG. 2 generally along line 3-3 in FIG. 2;

FIG. 4 is a simplified view of the torsion damper shown in FIG. 2;

FIG. 5 is a cross-sectional view of the torsion damper shown in FIG. 4 generally along line 5-5 in FIG. 4;

DETAILED DESCRIPTION OF THE INVENTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
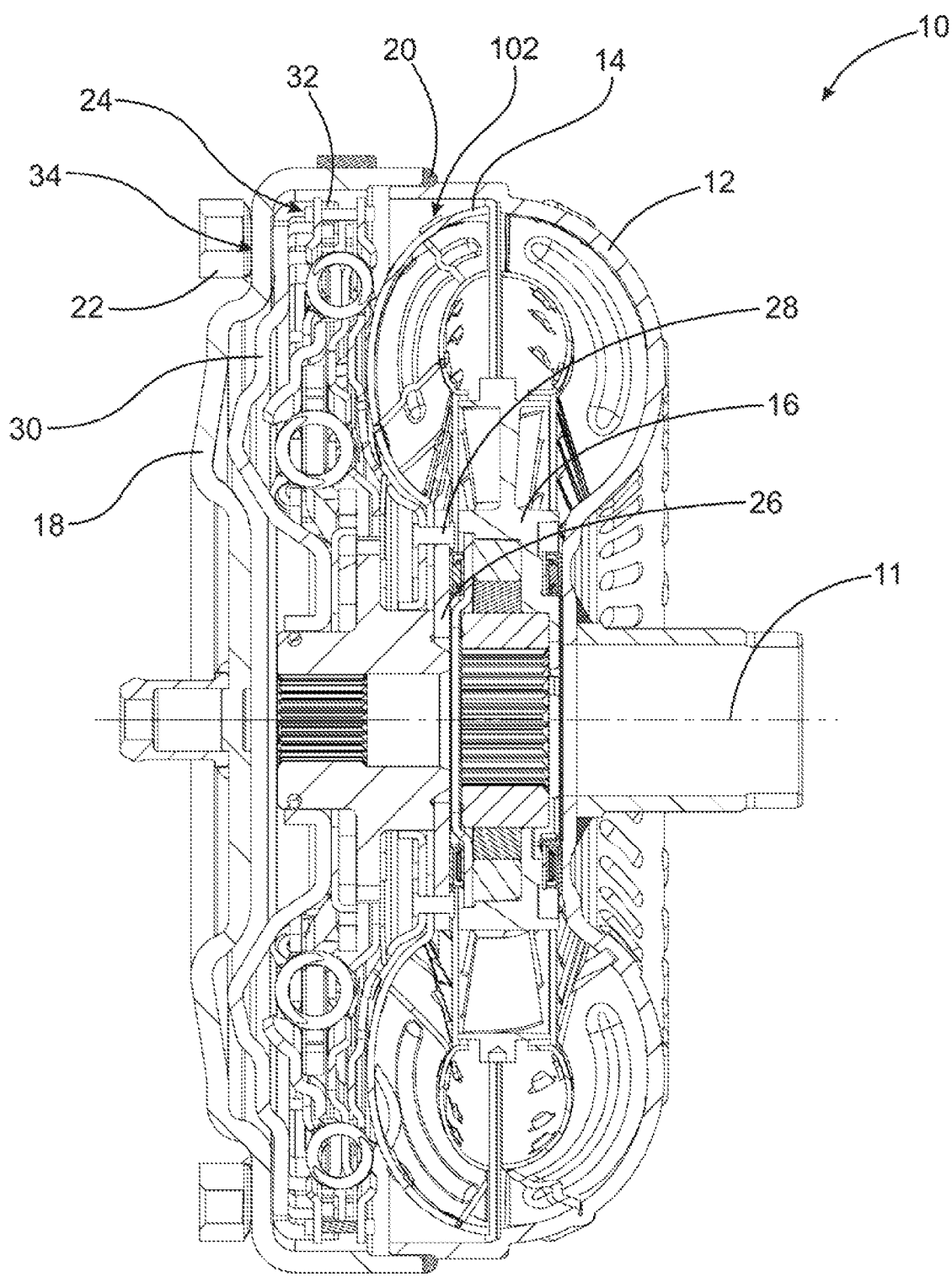
FIG. 1 is a cross-sectional view of a torque converter with a torsional damper according to an example aspect of the invention.

The following description is made with reference to FIG. 1. FIG. 1 is a cross-sectional view of a torque converter with a torsional damper according to an example aspect of the invention. Torque converter 10 includes impeller assembly 12, turbine assembly 14 and stator assembly 16. Cover 18 is drivingly engaged with impeller 12 at weld 20 and with a prime mover (not shown) at lugs 22. Turbine assembly 14 is fixedly connected to torsion damper 24 and drive plate 26 via rivet 28, for example. Piston plate 30 is drivingly engaged with torsion damper 24 at tabs 32. Piston plate 30 is engageable with cover 18 at friction interface, or clutch, 34.

The following description is made with reference to FIGS. 1-3. FIG. 2 is a front view of torsion damper 24 shown in FIG. 1 according to an example aspect of the invention. FIG. 3 is a cross-sectional view of torsion damper 24 generally along line 3-3 in FIG. 2. Torsion damper 24 includes outer cover plates 36 and 38 fixedly connected by rivet 40. Torsion damper 24 further includes inner cover plates 42 and 44 and flange 46. Flange 46 is drivingly engaged with hub 48 at rivets 50, for example. Hub 48 is engaged with and radially positioned by an output element such as an input shaft of a transmission (not shown). By radial, we mean orthogonal to axial axis 11 in FIG. 1.

Torsion damper 24 further includes outer plurality 52 of springs disposed between cover plates 36 and 38, and inner plurality 54 of springs disposed between cover plates 42 and 44. Although the foregoing description and example figures describe a particular number and configuration of springs, the scope of the present invention is not limited to that number and/or configuration only, and broadly construed, alternatively can also include different numbers and/or configurations of springs.

Radial position of cover plate 36 is adjusted by pilot interface 56 defined by axially extending portion 58 of cover plate 36 and pilot surface 60 of hub 48. By axial, we mean parallel to axis 11. Unless stated otherwise, an axis in the discussion below is parallel to axis 11. Radial position of flange 46 is adjusted by rivets 50 and hub 48. That is, radial positions of cover plate 36 and flange 46 are controlled by hub 48, which is in turn radially positioned by an input shaft (not shown) as described above.

Cover plates 42 and 44 include plurality 62 of outer spring windows, or cutouts, for receiving plurality 52 of outer springs and plurality 64 of inner spring windows, or cutouts, for receiving plurality 54 of inner springs. Radial position of cover plates 42 and 44 is adjusted by force of spring pluralities 52 and 54 engaged with window pluralities 62 and 64. That is, radial position of cover plates 42 and 44 is not adjusted by a direct interface with hub 48.

The following description is made with reference to FIGS. 4 and 5. FIG. 4 is a simplified front view of torsion damper 24 shown in FIG. 2 showing a portion of cover plates 42 and 44, and flange 46, for example. FIG. 5 is a cross-sectional view of torsion damper 24 generally along line 5-5 in FIG. 4. Cover plates 42 and 44 each include central axis 94 parallel to damper axis 66 and passing through the center of bores 68 and 70, respectively. Flange 46 includes a central axis 96 parallel to damper axis 66 and passing through the center of extruded cylinder 72.

Cover plates 42 and 44 include respective outer diameters 74 and 76. Flange 46 includes outer diameter 78 (shown as a dashed line in FIG. 4). FIG. 4 shows cover plates 42 and 44, and flange 46 with central axes 94 and 96 aligned and coincident with damper axis 66. However, as can be seen in FIG. 4, outer diameters 74, 76, and 78 do not share a center point disposed along damper axis 66. For example, offset axis 80 passing through the center of outer diameters 74 and 76 is disposed to the right of damper axis 66 and offset axis 82 passing through the center of outer diameter 78 is disposed to the left of damper axis 66. By offset axis we mean an axis centered with respect to an outer diameter.

Blanks for cover plates 42 and 44 with outer diameters 74 and 76 have a center of mass CM1 disposed along offset axis 80. Material removal for central bores 68 and 70 adjusts the center of mass for cover plates 42 and 44, respectively, because central bores 68 and 70 are not radially aligned with offset axis 80. Likewise, the center of mass for a flange blank having outer diameter 78 prior to material removal for central bore 72 is disposed along offset axis 82. After material removal for central bores 68, and 70, center of mass CM2 for plates 42 and 44 is aligned with central axis 94. After material removal for central bore 72, center of mass CM3 for flange 46 is aligned with central axis 96. Thus, centers of mass disposed along offset axis 80 of cover plates 42 and 44 prior to material removal for central bores 68 and 70, respectively, and center of mass disposed along offset axis 82 of flange 46 prior to material removal for central bore 72, are radially displaced from respective centers of mass along central axes 94 and 96, respectively, after material removal for central bores 68, 70, and 72. Alternately stated, the respective centers of mass for the cover plates and the flange are different before and after the formation of the respective center bores.

Material removed to create pluralities 64 of spring windows may also adjust the respective centers of mass. For example, the center of mass for cover plates 42 and 44 resulting from windows 64 (individually labeled 64A) may be disposed along offset axis 80. Likewise, the center of mass for flange 46 resulting from windows 64 (shown as dashed lines in FIG. 4 and individually labeled 64B) may be disposed along offset axis 82. Plates 42, 44, and/or 46 may include additional mass or material removal at positions 88 with a center of mass disposed along axis 90, for example.

Figure 6:
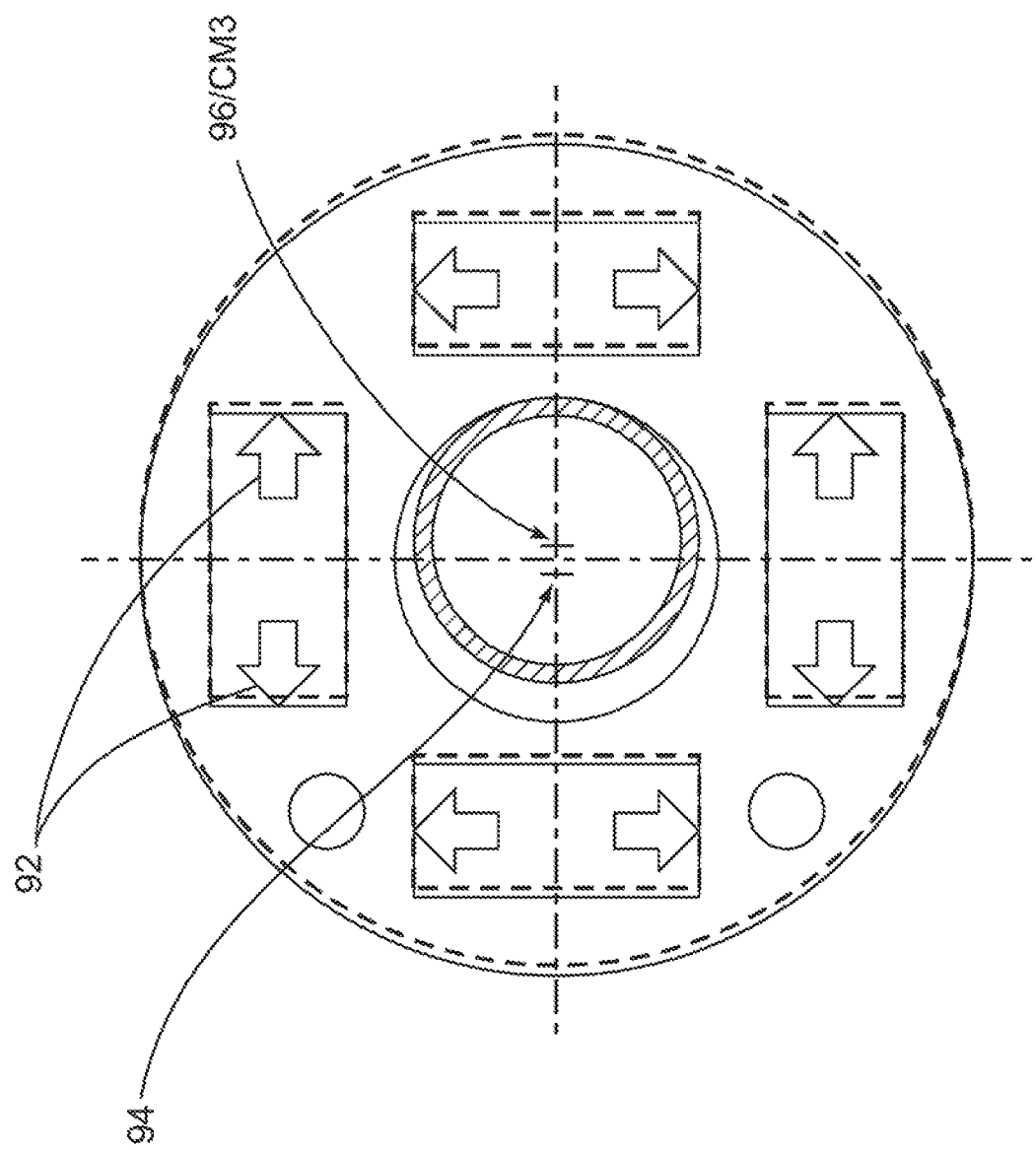
FIG. 6 is a front view of the torsion damper shown in FIG. 4 with the cover plates and flange displaced by force from the springs; and, FIG. 7 is a cross-sectional view of a cover plate shown in FIG. 4, generally along line 7-7 in FIG. 4.

The following description is made with reference to FIGS. 4-6. FIG. 6 is a simplified front view of torsion damper 24 with a portion of cover plates 42 and 44, and flange 46, shown displaced by force from plurality 54 of springs, for example. Spring force is indicated by arrows 92. Spring force 92 urges cover plates 42 and 44 to the left and urges flange 46 to the right, as shown in FIG. 6. As a result, offset axes 80 and 82 for cover plates 42 and 44, and flange 46, respectively, move towards and are nearly coincident with damper axis 66. Likewise, central axis 94 for cover plates 42 and 44 moves to the left, and central axis 96 for flange 46 moves to the right. That is, the springs urge central axis 94 to radially displace from central axis 96.

Central axes 94 and 96 are in a fixed alignment. That is, repeated rotational acceleration and deceleration about damper axis 66 leaves central axes 94 and 96 in a consistent radial position relative to one another. The relative displacement between axes 94 and 96 may be limited, or fixed, by the configuration of torsion damper 24. For example, contact between central bore 70 of cover plate 44 and extruded cylinder 72 of flange 46 may limit radial displacement of axes 94 and 96. For example, force applied to the cover plates by springs 54 causes the cover plates to radially displace with respect to each other until central bore 70 of cover plate 44 and extruded cylinder 72 of flange 46 come into contact. Advantageously, this contact occurs at substantially the same respective points on the central bore and the cylinder, essentially fixing the alignment between the axes.

Figure 7:

FIG. 7 is a cross-sectional view of a cover plate shown in FIG. 4, generally along line 7-7 in FIG. 4. Offset axes 80 and 82 are not coincident with respective central axes 94 and 96. Cover plates 42 and 44 exhibit rotational imbalance when rotated about central axis 94. Likewise, flange 46 exhibits rotational imbalance when rotated about central axis 96. Cutouts 85 and/or attached mass elements 87 at location 88 unbalances plates 42, 44, and/or 46. Imbalance from offset centers of mass imparts a dynamic force to the flange and cover plates, and keeps central bore 70 and extruded cylinder 72 in contact when damper 24 is under rotation.

The disclosed plate designs introduce a consistent imbalance to torsion damper 24. Force 92 of springs misaligns cover plates 42 and 44, and flange 46 so that their centers of mass are radially offset from damper axis 66. The imbalance is exaggerated by additional mass or mass removal at locations 88. Because the imbalance is consistent, it can be corrected for in assembly 10 by attaching balance weight 102 to turbine 14 (FIG. 1) for example. Furthermore, the disclosed plate designs improve measurement repeatability by maintaining the components in a consistent position when assembly 10 is rotated.

It should be understood that a present invention torsional damper is not limited to the number, size, shape, or configuration of components shown and that other numbers, sizes, shapes, or configurations of components are included in the spirit and scope of the claimed invention. It also should be understood that a present invention torsional damper is not limited to use in the torque converter shown and that a present invention torsional damper can be used in other types and configurations of torque transfer devices.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A torsion damper comprising:
   a plurality of springs;
   a first cover plate including:
      a first plurality of apertures engaged with the plurality of springs and in which the plurality of springs is at least partially located; and,
      a first center of mass; and,
   a flange plate including:
      a second plurality of apertures engaged with the plurality of springs and in which the plurality of springs is at least partially located; and,
      a second center of mass, wherein:
         the first cover plate includes a first central axis radially centered with respect to the first center of mass;
         the flange plate includes a second central axis radially centered with respect to the second center of mass; and,
         the first and second central axis are non co-linear.

2. The torsion damper of claim 1, wherein a radial offset between the central axis for the first plate and the central axis for the flange is fixed.

3. The torsion damper of claim 2, wherein the first plate comprises a central bore and the flange comprises an extruded cylinder; and the fixed alignment is maintained by contact between the central bore and the extruded cylinder.

4. The torsion damper of claim 1, wherein the first plate comprises a central bore and the flange comprises an extruded cylinder and wherein the plurality of springs displaces the first plate and the flange so that the central bore and the extruded cylinder are in contact.

5. The torsion damper of claim 1, wherein the first plate or the flange exhibits rotational imbalance when rotated about its central axis.

6. The torsion damper of claim 1, wherein the first plate or the flange includes a respective cutout and wherein under rotation, the respective cutout unbalances the first or second plate.

7. The torsion damper of claim 1, wherein the first plate or the flange includes a respective mass element attached to the plate and wherein, under rotation, the respective mass element unbalances the first or second plate.

8. The torsion damper of claim 1, wherein the first plate includes an outer circumference and a central bore forming an inner circumference and wherein a radial distance between the inner and outer circumferences is non-uniform.

9. A torsion damper comprising:
   a plurality of springs;
   a first cover plate including:
      a first plurality of apertures engaged with the plurality of springs and in which the plurality of springs is at least partially located;
      a central bore; and,
      an outside diameter; and,
   a flange plate including a second plurality of apertures engaged with the plurality of springs and in which the plurality of springs is at least partially located, wherein:
      the first cover plate includes a first central axis radially centered with respect to the central bore;
      the first cover plate includes an offset axis radially centered with respect to the outside diameter; and,
      the first central axis and the offset axis are non co-linear.

10. The torsion damper of claim 9 wherein the first plate with the central bore and the first plurality of apertures has a first center of mass.

11. The torsion damper of claim 10, wherein the first central axis passes through the first center of mass, wherein the flange plate includes a second center of mass and a second central axis parallel to the first central axis and passing through the second center of mass for the flange plate, and wherein the first central axis and the second central axis are radially offset.

12. The torsion damper of claim 11, wherein the first central axis and the second central axis are in a fixed radial alignment.

13. The torsion damper of claim 12, wherein the flange plate comprises an extruded cylinder and the fixed radial alignment is maintained by contact between the first plate central bore and the flange plate extruded cylinder.

14. The torsion damper of claim 9, wherein:
   the flange plate includes an extruded cylinder; and,
   the plurality of springs displaces the first plate and the flange plate so that the central bore and the extruded cylinder are in contact.

15. The torsion damper of claim 9, wherein the first plate includes an outer circumference and the central bore forms an inner circumference and wherein a radial distance between the inner and outer circumferences is non-uniform.

16. A torque converter, comprising:
  an output hub;
  a cover;
  a pump shell fixedly connected to the cover;
  a torque converter clutch; and,
  a torsion damper including:
    a first plurality of springs;
    a second plurality of springs radially inward of the first plurality of springs;
    first and second cover plates engaged with the first and second pluralities of springs; and,
    a flange engaged with the second plurality of springs and arranged to transmit torque to the output hub, wherein:
      the flange includes a first central bore and a first central axis radially centered with respect to the first central bore;
      the flange includes an outside diameter and an offset axis radially centered with respect to the outside diameter; and,
      the first central axis and the offset axis are non co-linear.

* * * * *